W. F. EDGINGTON & A. MURRAY.
TIRE TOOL.
APPLICATION FILED APR. 18, 1912.
1,090,290.
Patented Mar. 17, 1914.
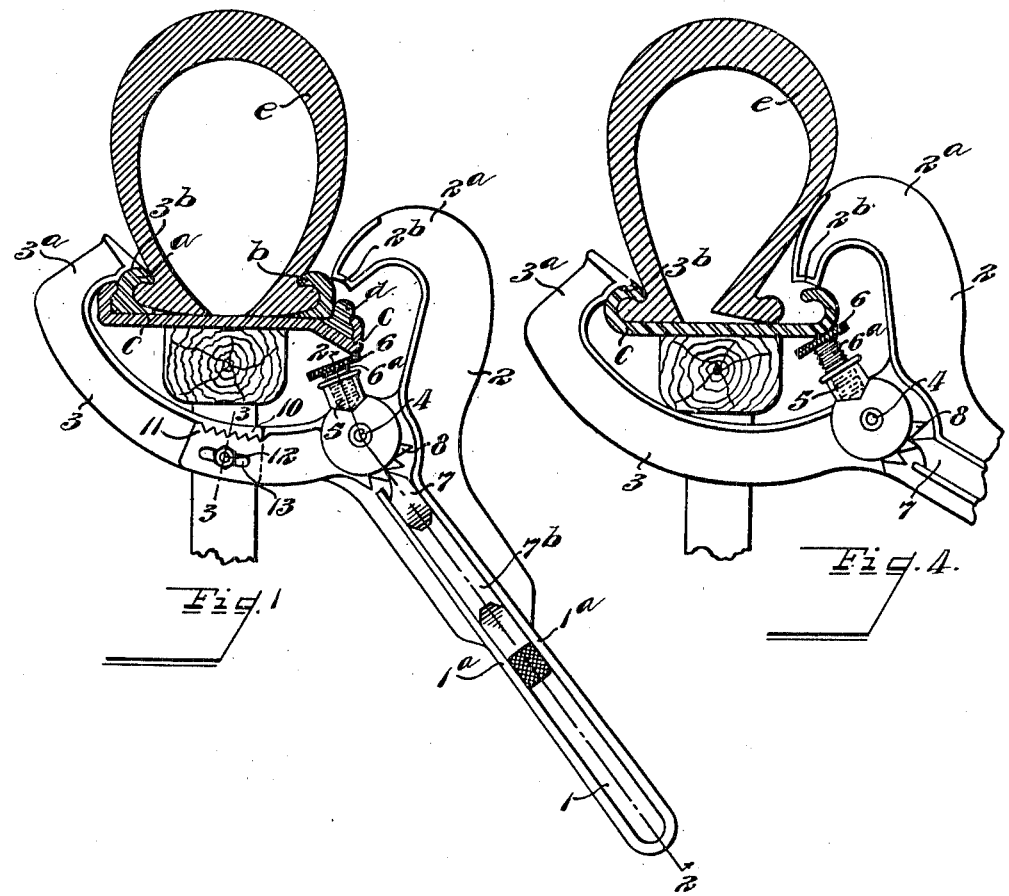
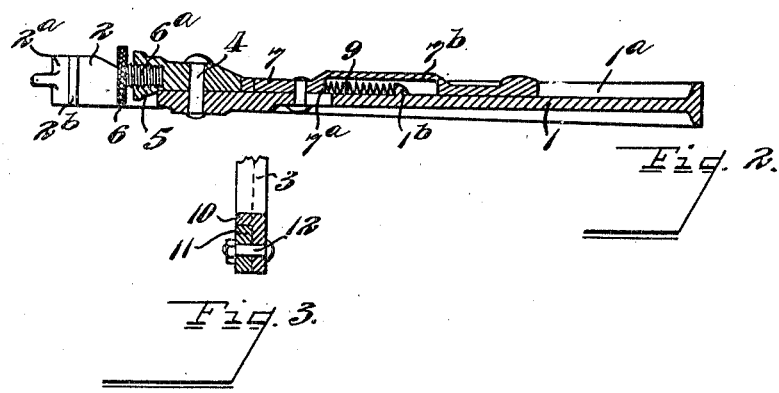

UNITED STATES PATENT OFFICE.

WILLIAM F. EDGINGTON AND ALEXANDER MURRAY, OF SPRINGFIELD, OHIO.

TIRE-TOOL.

1,090,290.  Specification of Letters Patent.  Patented Mar. 17, 1914.

Application filed April 18, 1912. Serial No. 691,640.

*To all whom it may concern:*

Be it known that we, WILLIAM F. EDGINGTON and ALEXANDER MURRAY, citizens of the United States, residing at Springfield, in the county of Clark and State of Ohio, have invented certain new and useful Improvements in Tire-Tools, of which the following is a specification.

Our invention relates to a tool for removing pneumatic tires.

The object of our invention is to provide a tool for dislodging the outer casing of a pneumatic tire and also the clamping ring for the same, where such clamping ring is employed, which will be simple in construction and effective in operation.

In the accompanying drawings,—Figure 1 is a vertical section through a wheel felly and a pneumatic tire of the quick detachable type, showing our tool in a position of operation. Fig. 2 is a longitudinal section of the tool on the line 2—2 of Fig. 1. Fig. 3 is a transverse section through a portion of the tool on the line 3—3 of Fig. 1. Fig. 4 is a section through a wheel felly and a pneumatic tire of a well-known clencher type showing our tool applied thereto, and also showing a slight modification in the tool itself.

Like parts are represented by similar characters of reference in the several views.

Considerable difficulty is generally experienced in removing the outer casings of pneumatic tires from the channels, as well as the clamping rings for the same, due to the fact that the collection of rust and dirt causes the same to stick, requiring the casing and ring to be pried loose. In order to make these parts more easily and readily removable, we have devised the following construction:

In the said drawings, 1 represents a main operating lever having a curved part 2 which has its outer end formed on a pronounced curve much in the shape of a hook or arch as indicated at 2ª, the extreme end of this hook-shaped portion being formed with a concave face as indicated at 2ᵇ. Pivotally secured to the lever 1 as at 4, is a laterally and forwardly projecting curved arm 3, of greater length than the curved lever part 2. This arm 3 has its outer end bent sharply inwardly as indicated at 3ª, which inturned end is also formed with a concave face as indicated at 3ᵇ.

Projecting from the arm 3 in proximity to the pivotal point thereof, is a screw-threaded boss 5 in which is screwed a brace consisting of a knurled flat plate or head 6 having a screw-threaded shank 6ª; which provides for forming a positioning device for the tool in the manner hereinafter described.

Slidably mounted between longitudinal guide ribs 1ª on the upper side of the lever 1 is a pawl 7, normally spring-pressed into engagement with a series of ratchet teeth 8, arranged about the pivotal point of the arm 3, by a spring 9, located in a housing 7ᵇ formed in the pawl, and being interposed between a projecting lug 1ᵇ on the lever 1, and the forward end 7ª of said housing 7ᵇ.

In the form shown in Fig. 1, the arm 3 is made adjustable in length by forming it in two parts, the adjacent ends of the respective parts being offset as shown in Fig. 3 and provided with inter-engaging serrations 10 and 11 so that they will be securely locked together by a bolt 12 which extends through a perforation in one of the parts and the slotted opening 13 in the other of said parts so that the length of said arm may be adjusted by simply unloosening the bolt and changing the relation of the inter-engaging serrations.

The operation of the tool is as follows: When it is desired to remove a tire of the quick detachable type such as illustrated in Fig. 1, the concave face 3ᵇ of the arm 3 is placed in position against the channel flange, *a*, which is on the opposite side of the tire from the operator, and the end 2ᵇ of the lever part 2 is laid against the detachable channel flange, *b;* the peculiar curved shape of these parts permitting them to extend beneath and about the channel proper as well as the clamping rim. The fulcrum brace 6 is then adjusted against the lower side of the channel, *c*, whereupon, the operator may, by operating the lever, force the detachable flange inwardly, the ratchet and pawl 7 and 8 holding the tool in this position. The operator then places an obstruction of some sort between the flange *b*, and the locking ring, *d*, moves the tool to another position upon the tire and repeats the operation. After the flange, *b*, and the casing, *e*, have thus been forced in a sufficient distance about the periphery of the wheel, the locking ring *d* may be removed which will thus permit the removal of the casing and flange. In actual use, these locking rings frequently become stuck from rust or otherwise, in which case the tool may be utilized to remove the ring, the concave face 2ᵇ of the extension 2 being placed against this ring and the tool operated in the same manner as described in connection with the flange *b*. When the arm 2 is brought in position to engage the locking ring, *d*, the fulcrum brace 6 will necessarily have to be changed, which may readily be done by screwing the same outwardly until it again rests against the channel, *c*.

When it is desired to remove a casing of a tire such as that shown in Fig. 4, the end of the arm 2ᵃ is placed directly against the casing itself and the tool is operated in the manner before described, thus forcing the casing in to the position shown in the drawings, in which position it can be held by inserting a suitable obstruction, and the operation repeated.

In some cases, where the outer casing or the removable flange, *a*, has become frozen, it may be necessary to reverse the tool, and place the end of the arm 2 against the outer casing or against the removable flange, *a*, and repeat the operation.

Having thus described our invention, we claim:

1. In a tire tool, a main lever having a curved part, a curved arm pivotally connected with said lever, and a brace screw-threaded in said arm near the pivotal point thereof so as to be adjustable with respect thereto.

2. In a tire tool, a lever, an arm pivoted to said lever, said lever and arm being so formed as to extend on opposite sides of a pneumatic tire and its supporting devices and engage the same, and an adjustable screw threaded head arranged substantially as and for the purpose specified.

3. In a tire tool, a main lever, an arm to which said lever is fulcrumed, said arm and lever being so formed as to engage opposite sides of a pneumatic tire and its supporting devices, a brace for the fulcrum of said lever, and a pawl on said lever and a ratchet on said arm.

4. In a tire tool, a main lever, an arm to which said lever is fulcrumed, said arm and lever being so formed as to engage opposite sides of a pneumatic tire and its supporting devices, a brace for the fulcrum of said lever, and means for holding said arm and lever in different positions with respect to each other.

5. In a tire tool, a member arranged to engage one side of a pneumatic tire or its channel and extending under said tire to the opposite side thereof, an adjustable part screw-threaded in said member to engage the under side of the tire channel, and a lever pivotally connected with said member arranged to exert a pressure against the other side of said tire or the channel, for the purpose specified.

In testimony whereof, we have hereunto set our hands this 16th day of April 1912.

WILLIAM F. EDGINGTON.
ALEXANDER MURRAY.

Witnesses:
  CHAS. I. WELCH,
  ESTHER E. PFEIFER.